W. EIERMANN.
ASH CART.
APPLICATION FILED SEPT. 1, 1916.
1,224,290.
Patented May 1, 1917.
2 SHEETS—SHEET 1.
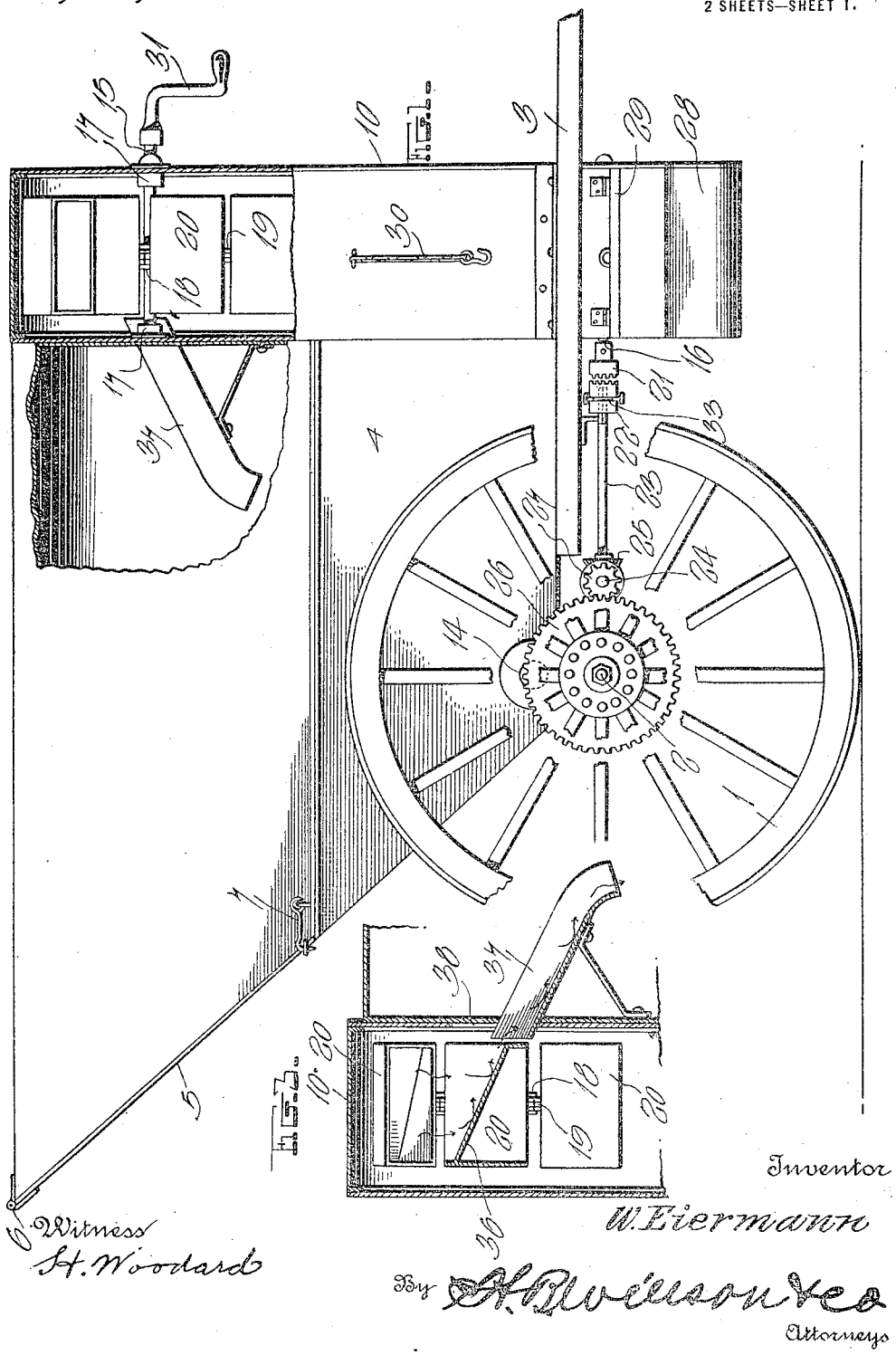
Witness
H. Woodard
Inventor
W. Eiermann
By H. R. Willson & Co.
Attorneys

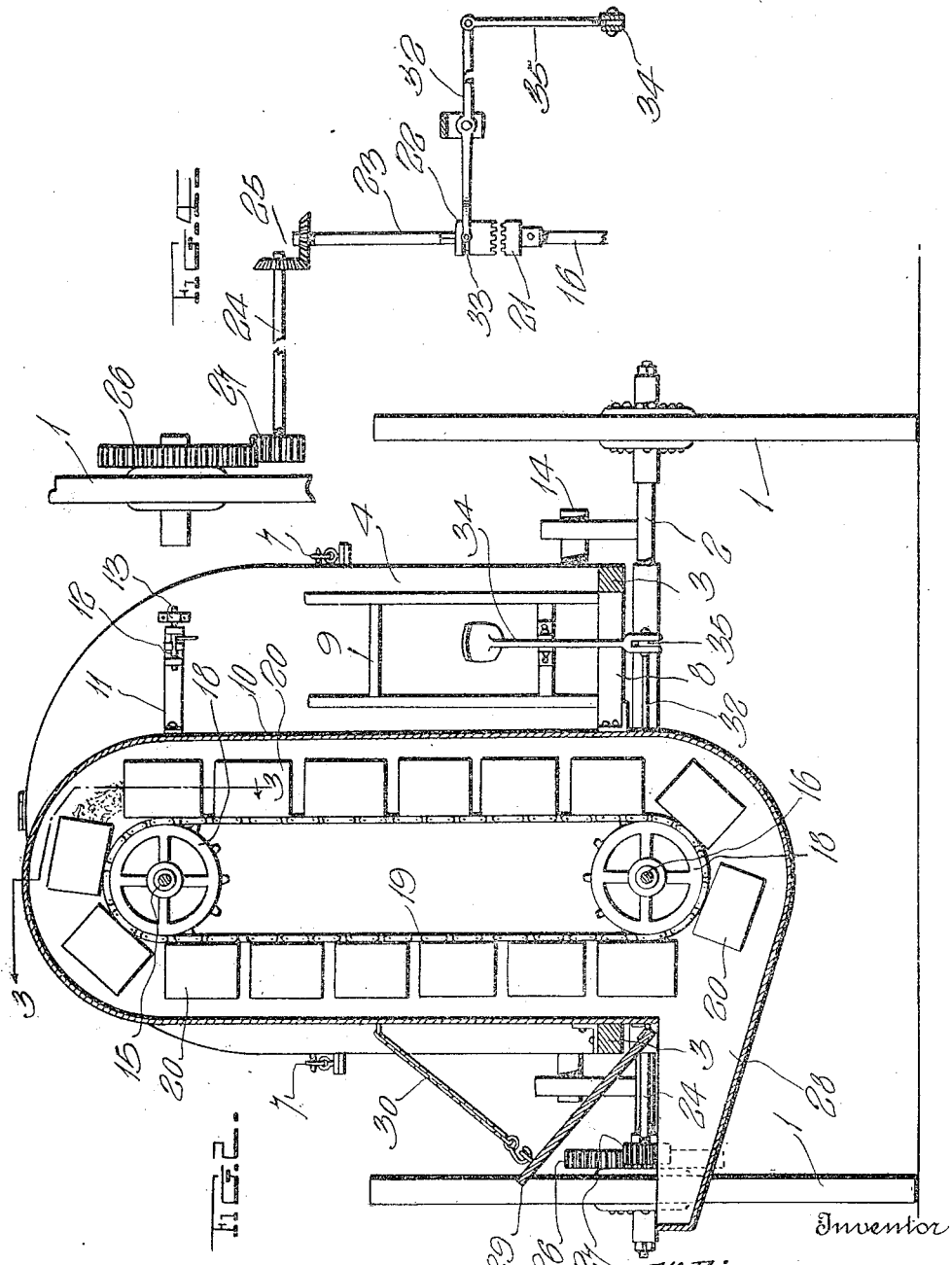

UNITED STATES PATENT OFFICE.

WILLIAM EIERMANN, OF BROOKLYN, NEW YORK.

ASH-CART.

1,224,290.

Specification of Letters Patent.

Patented May 1, 1917.

Application filed September 1, 1916. Serial No. 118,060.

*To all whom it may concern:*

Be it known that I, WILLIAM EIERMANN, a citizen of the United States, residing at Brooklyn, in the county of Kings and State of New York, have invented certain new and useful Improvements in Ash-Carts; and I do declare the following to be a full, clear, and exact description of the invention, such as will enable others skilled in the art to which it appertains to make and use the same.

My invention aims to provide a simple and efficient cart or wagon for collecting ashes and the like in such a manner as to prevent the dust thereof from scattering, the machine including a conveyer which may be operated either manually or by the passage of the wagon over the street, said conveyer serving to deposit the material collected into an airtight body.

With the foregoing general object in view, the invention resides in certain novel features of construction, and in unique combinations of parts to be hereinafter fully described and claimed, the descriptive matter being supplemented by the accompanying drawings which constitute a part of this application, and in which:

Figure 1 is a side elevation of the improved cart with parts broken away and in section;

Fig. 2 is a front elevation with the conveyer casing in section;

Fig. 3 is a detail vertical section on the plane of the line 3—3 of Fig. 2; and

Fig. 4 is a plan view of the means for driving the conveyer mechanically.

In the drawings a suitable truck is shown consisting of a pair of wheels 1 on the ends of an axle 2, and thills 3 extending forwardly from said axle. An airtight body or receptacle 4 is mounted on the truck and is provided with an upwardly and rearwardly inclined rear end whose upper half 5 is hinged at its upper edge as shown at 6, said half constituting a tail gate and being held in operative position by means of hooks or the like 7. A driver's platform 8 is disposed in advance of one side of the receptacle 4 and a suitable frame 9 rises from the front end of said platform in the usual manner.

A conveyer casing 10 is disposed vertically in front of the receptacle 4 and at its lower end is secured between one of the thills and the platform 8, said casing, however, being disconnected from said receptacle with one exception, this being at its upper end, the latter being provided with a laterally extending bracket 11 carrying a sliding bolt or the like 12 for reception in a keeper 13 carried by said receptacle (see Fig. 2). When the bolt 12 is released the entire receptacle 4 may tilt rearwardly around a pair of journals 14 on which it is mounted, but when said bolt is in the position shown in Fig. 2, tilting of the receptacle is prevented.

Shafts 15 and 16 extend across the casing 10 at the upper and lower ends thereof, being mounted in any suitable dust proof bearings 17, and both of said shafts are provided with sprockets 18 disposed in the casing, a chain 19 being trained around said sprockets and carrying a plurality of buckets 20 of unique construction yet to be described.

The rear end of shaft 16 extends beyond the casing 10 and is provided with a relatively fixed clutch member 21 coöperating with a movable member 22 on a longitudinally disposed shaft 23 carried by the truck. The shaft 23 is driven from a transverse shaft 24 by means of beveled gears 25, and said transverse shaft is rotated from one of the wheels 1 by a spur gear 26 and pinion 27. It will thus be evident that when the clutch (consisting of the members 21 and 22) is thrown in, the conveyer within the casing 10 will be driven to elevate the material deposited in the lower end of said casing.

An inlet chute 28 extends laterally from the lower end of the casing 10 and is formed with an opening in its upper side normally closed by a hinged door 29 which may be held in raised position by a chain 30 as indicated in Fig. 2.

Whenever occasion may demand, the conveyer may be operated by hand by the application of a crank 31 to the squared front end of shaft 15, as shown in Fig. 1, this being necessary when a considerable amount of ashes or the like is placed in the chute 28 while the cart is standing idle. Under other conditions, the conveyer will be driven as the cart is drawn along the street and is thus adapted to elevate the material in the casing 10 and deposit it into the receptacle 4. To permit the clutch to be thrown in and out at the will of the operator, suitable foot controlled connections are provided as shown in Figs. 2 and 4, these connections preferably consisting of a lever 32 having a forked end with pins traveling in a groove 33 in the movable clutch member 22, a foot lever 34, and a link 35 connecting the two levers.

As each bucket 20 reaches the limit of its upward movement and starts downwardly, it begins to discharge the ashes therein, the latter being now caught by the inclined bottom 36 of the bucket whose load has just been discharged, the several bottoms 36 serving to conduct the ashes or other material into an inclined chute 37 carried by the receptacle 4 and projecting into the casing 10 through an opening 38 in the rear side thereof (see more particularly Fig. 3).

By constructing the buckets 20 in the manner shown and described and allowing them to direct the material on the chute 37 as explained, great economy in space is had since the conveyer can operate in a plane transversely of the line of draft of the cart instead of longitudinally thereof as would be necessary if the buckets did not deliver laterally. This is therefore deemed a salient feature of the invention.

In use, the material collected is deposited into the lower end of casing 10 through the inlet chute 28 thereof and the door 29 is then closed. If only a small quantity of ashes or the like be placed in chute 28 before hauling the cart to another point, the clutch will be thrown in and thus as the machine is pulled along, the material from the lower end of the casing will be carried to the upper end thereof and deposited onto the chute 37. If, however, at any one place an unusual amount is to be collected, the clutch should be thrown out and by means of the crank 31 the conveyer will be operated by hand so as to make room for the additional material. In either case, the loading operation will be practically dustless due to the comparatively airtight construction of the entire device. In dumping the load the bolt 12 is retracted and the tail gate 5 is opened, whereupon rearward tilting of the receptacle 4 upon its journals 14 will cause the ashes or the like therein to be discharged.

The construction shown and described is simple and inexpensive yet highly advantageous, and for these reasons constitutes the preferred form of the machine. It is to be understood, however, that within the scope of the invention as claimed, numerous changes may be made without sacrificing the principal advantages.

I claim:

A collecting machine of the class described comprising a portable truck, a vertical conveyer casing rising rigidly from said truck and having in one side a discharge opening, said casing also having an inlet, a tilting receiver mounted on said truck and having one side disposed adjacent said side of the conveyer casing and formed with an opening registering with said discharge opening, a receiving chute carried rigidly by said receiver and projecting through the opening thereof and through said discharge opening into the conveyer casing when said receiver is in operative position, said discharge opening being of a size to permit the chute to leave the same when the receiver is tilted to discharge its load, and a conveyer in said casing for lifting material deposited therein and discharging it into said chute.

In testimony whereof I have hereunto set my hand in the presence of two subscribing witnesses.

WILLIAM EIERMANN.

Witnesses:
  MORRIS GROTENSTEIN,
  PETER C. DE NEALE.

Copies of this patent may be obtained for five cents each, by addressing the "Commissioner of Patents, Washington, D. C."